United States Patent [19]
Von Viebahn et al.

[11] 4,300,673
[45] Nov. 17, 1981

[54] APPARATUS FOR TRANSFERRING MATERIAL BETWEEN CONVEYORS

[75] Inventors: Hans-Eckart Von Viebahn; Helmut Trusczcinski, both of Lünen, Fed. Rep. of Germany

[73] Assignee: Gewerkschaft Eisenhütte Westfalia, Fed. Rep. of Germany

[21] Appl. No.: 85,041

[22] Filed: Oct. 15, 1981

[30] Foreign Application Priority Data

Nov. 9, 1978 [DE] Fed. Rep. of Germany ....... 2848609

[51] Int. Cl.³ .............................................. B65G 37/00
[52] U.S. Cl. ................................... 198/611; 198/723; 299/43
[58] Field of Search ............... 198/598, 606, 611, 612, 198/610, 560, 489, 490, 723, 787, 525, 526, 527; 299/34, 43, 46; 193/35 R

[56] References Cited

U.S. PATENT DOCUMENTS

| 961,193 | 6/1910 | Wood | 198/611 X |
|---|---|---|---|
| 1,436,907 | 11/1922 | Quaas | 198/560 |
| 1,737,829 | 12/1929 | Cosgrove | 198/611 |
| 1,776,568 | 9/1930 | O'Neale | 198/562 |
| 2,860,790 | 11/1958 | Erickson et al. | 198/611 X |
| 3,337,023 | 8/1967 | Kohl et al. | 198/787 |
| 3,365,053 | 1/1968 | Brill | 198/733 X |
| 3,367,717 | 2/1968 | Rösler et al. | 299/34 |
| 3,401,787 | 9/1968 | Vaka | 198/723 |
| 3,934,706 | 1/1976 | Tice | 193/35 R X |

FOREIGN PATENT DOCUMENTS 1141590 12/1962 Fed. Rep. of Germany ...... 198/598

Primary Examiner—James L. Rowland
Attorney, Agent, or Firm—Charles E. Pfund

[57] ABSTRACT

Apparatus facilitates the transfer of material from the discharge zone of one mine conveyor onto another conveyor extending perpendicularly to the first conveyor. The transfer apparatus can take the form of a rotatably driven disc disposed beneath the elevated discharge zone of the first conveyor so that the material falls onto the disc. The disc extends over the other conveyor. A scraper lies across the disc to scrape and guide the material into the other lower conveyor. Alternatively, the disc or a modified equivalent component is made stationary while a single scraper or several such scrapers rotate over the disc. The transfer apparatus can also take the form of a curvilinear trough or chute onto which the material falls from the elevated discharge zone of the first conveyor and is guided to the other conveyor. Several driven rollers or paddles or a scraper-chain assembly then impell the material along the chute.

8 Claims, 5 Drawing Figures

APPARATUS FOR TRANSFERRING MATERIAL BETWEEN CONVEYORS

BACKGROUND TO THE INVENTION

The present invention relates to apparatus for transferring material between conveyors especially, but not solely, conveyors in mine workings.

In underground mine workings, it is known to discharge material from one end of a face conveyor onto a roadway conveyor. Usually, the conveyors extend at right angles to one another and the face conveyor is elevated at its end region so that the material falls onto the roadway conveyor. Often material becomes jammed at the transfer station and this is especially the case where the material contains large irregular pieces—such as with coal winning. To better guide the material at the transfer station, it is known to utilize an inclined chute or channel which guides the material through 90° but accumulations and jamming can still occur. In order to preclude this problem, it is known to install a curved intermediate conveyor section between the face and roadway conveyors and to cause the scraper-chain assembly to take the material around the curved section via a roller or similar guide. Examples of curved intermediate conveyor sections are described in German patent specifications Nos. 2013089, 2163497, 2301348 and 2065424. Although jamming is reliably prevented by these measures, the curved sections are expensive to construct and the deflection of the scraper-chain assembly from the face conveyor to the roadway conveyor involves exceptionally high traction forces and consequently the chains and drive systems must be especially robust which again involves extra expense.

A general object of the present invention is to provide an improved transfer apparatus for facilitating the transfer of material between conveyors.

BRIEF SUMMARY OF THE INVENTION

Transfer apparatus constructed in accordance with the invention is characterized by at least one driven device and preferably at least one rotatably driven device. The driven device moves in the direction of transference and impells the material preferably over or against guide means. This simple concept can provide trouble-free transference but without unduly high constructional expense. The principle of the invention can be realized in various forms. In one embodiment of the invention, the driven device is a rotatable disc or wheel. This disc can extend beneath the discharge zone of one conveyor, e.g., a face conveyor, and above the other conveyor, e.g., a roadway conveyor. The material thus-discharged falls onto the disc and is transported through, usually, 90° to a zone where it falls onto the other conveyor. The material is subjected to a centrifugal force by the rotation of the disc which can act to impel the material in the direction of conveyance effected by the other conveyor. The disc can extend to a significant extent beneath the discharge zone of the first conveyor to ensure that even fine material which tends to become entrained can still fall onto the disc. The radius of the disc is preferably about the width of the other conveyor. The disc and its rotary bearing and associated drive need not take up much room and can thus be accommodated without extensive adaptive modifications. The drive to the disc can be easily realized where the discharge zone is at a drive station for the face conveyor and possibly for a winning machine, since separate gearing can couple one of the existing drive motors to the disc. Since the quantity of material discharged by the face conveyor can vary considerably, it is expedient to provide a drive system for the disc which enables the disc to be driven at variable speed. This can be realized by variable speed gearing. The disc with its bearing and drive can be mounted to a machine frame of the face conveyor so as to be shiftable with the drive station to follow the working progress. Conveniently, the frame and associated units are mounted on a carriage which raises the discharge zone above the other conveyor.

To assist the transference of material by the disc, it is advisable to mount a scraper over the upper surface of the disc. Conveniently, the scraper is positionally adjustable so it can be set in situ. The scraper may extend from near to the rotational axis of the disc right up to its external periphery.

The upper surface of the disc tends to be subjected to considerable wear and a wear resistant replaceable component can be placed onto the disc to provide an upper working surface therefor.

Guard plates, conveniently of curved profile, may be mounted to the sides of one or both conveyors to prevent side spillage of material.

In another form of apparatus, the aforementioned disc, or a functionally similar plate of some other shape, is rendered stationary and a scraper or paddle or several such devices rotate over the disc or plate. In this type of apparatus, the material again falls onto the disc or plate and is then carried across the disc or plate by the driven device or devices. The stationary disc or plate can extend beneath the discharge zone but have a discharge edge terminating somewhere above the other conveyor. This modified apparatus can otherwise be connected to the machine frame of the face conveyor and constructed and arranged as described above.

In another embodiment of apparatus constructed in accordance with the invention, a curvilinear chute or channel extends between the conveyors and one or more driven devices are mounted at least at the outer side of the chute. The driven devices may be simple rollers or paddles or a scraper-chain assembly. In all these cases, the driven device or devices impel the material along the chute to prevent accumulations and hence jamming. Where the driven devices are rollers, they can be driven individually or collectively, say by a chain drive. To permit the chute to be adjusted to the prevailing conditions in situ, it is desirable to pivot the chute to the machine frame and/or to make the chute from multiple adjustable components, e.g., telescopically arranged.

The invention may be understood more readily, and various features and aspects of the invention may become apparent from consideration of the following description.

BRIEF DESCRIPTION OF DRAWINGS

Embodiments of the invention will now be described, by way of examples only, with reference to the accompanying drawings, wherein:

FIG. 2A is a fragmentary elevation of the disc to larger scale showing a replaceable wear surface;

DESCRIPTION OF PREFERRED EMBODIMENTS

Figure 1A:
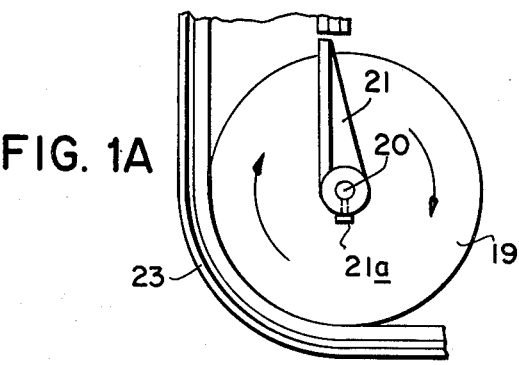
FIG. 1A is a fragmentary plan view of FIG. 1 showing a curved outer guard plate.

As shown in FIGS. 1, 1A, 2 and 2A, a mineral mining installation includes, inter alia, a longwall scraper chain conveyor 10 arranged in known manner alongside a mineral, e.g., coal face denoted 12. At a drive and transfer station, as illustrated, the conveyor 10 leads up to a roadway conveyor 11 disposed normally at right angles to the conveyor 10. The conveyor 11 may also take the form of a scraper-chain conveyor. A mineral winning machine, such as a plough 13, is movable back and forth along the face 12 to strip mineral from the face 12. The mineral thus-removed is transferred away by the conveyor 10 in known manner. The plough 13 is movable along a guide 14 mounted to the conveyor 10. A plough drive 15 propels the plough 13 along the guide 14 and a conveyor drive 16 circulates the scraper-chain assembly of the conveyor 10 along its pans. The plough drive 15 and the conveyor drive 16 are mounted to a machine frame 17 at the end of the conveyor 10 to form a drive station. The conveyor drive 16 is coupled to a drum 18 rotatably mounted to the frame 17 and around which the scraper-chain assembly is entrained. The conveyor 10 is advanced towards the face 12 from time-to-time in the direction of arrow A, FIG. 1, in accordance with the winning progress.

Figure 1:
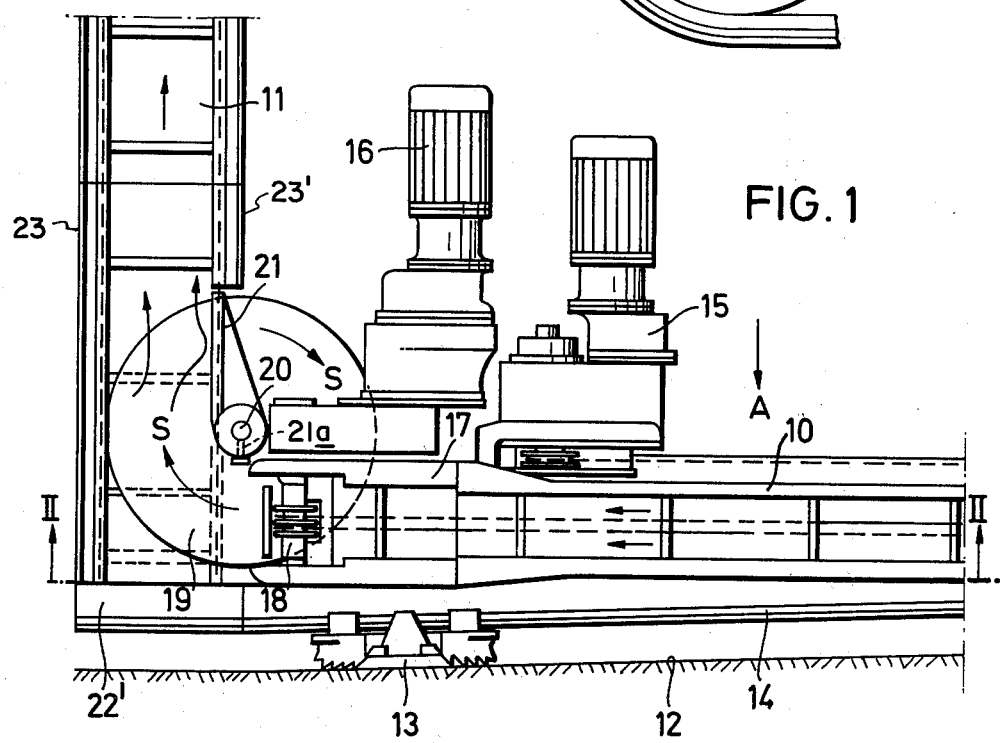
FIG. 1 is a schematic plan view of part of a mineral mining installation employing apparatus constructed in accordance with the invention.

The material transported by the conveyor 10 moves in the direction of the double-arrow in FIG. 1 towards the roadway conveyor 11. The material passes over the drum 18 and is transferred with apparatus constructed in accordance with the invention onto the conveyor 11. The transfer apparatus takes the form of a disc or wheel 19 rotatably driven about a bearing spindle with a vertical axis 20 and in the direction of arrow S, FIG. 1. The diameter of the disc 19 and its position are such that it extends beneath the frame 17 and the drum 18 and substantially over the entire width of the conveyor 11. The material passed over the drum 18 onto the disc 19 is taken up thereby and transferred in the direction of arrow S, thereby changing direction by approximately 90 degrees. Centrifugal force tends to discharge the material from the disc 19 onto the conveyor 11 generally in the desired direction of transport of the conveyor 11, as indicated by arrows in FIG. 1. In addition, however, a scraper 21 extending over the disc 19 scrapes away any residual material from the disc 19 so this material is directed also onto the conveyor 11. The scraper 21 extends from near the bearing spindle of the disc 19 approximately to the periphery of the disc 19 to terminate just above the side wall of the conveyor 11 nearest the drives 15,16. It is desirable to make the scraper 21 adjustable, e.g., pivotable about the axis 20, so that it can be positioned correctly. To this end, the scraper 21 is mounted to the spindle by means of a set screw 21a, FIGS. 1 and 1A. Desirably, the disc 19, FIG. 2A, comprises a lower part 19a and a replaceable, wear-resistant upper part 19b detachably attached to the lower part by screws 19c.

Figure 2:
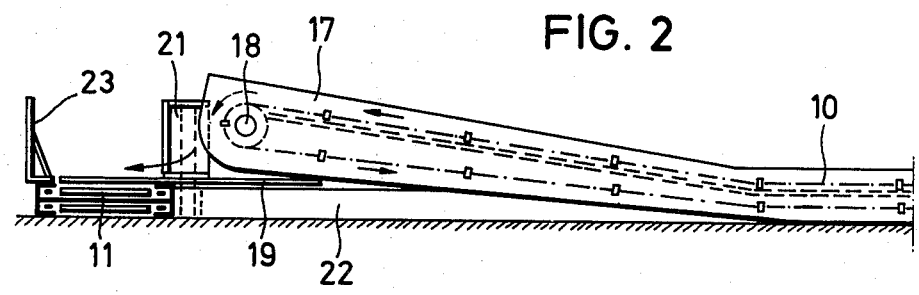
FIG. 2 is a part-sectional side view of the arrangement depicted in FIG. 1, the view being taken along the line II—II of FIG. 1.

As shown in FIG. 2, the entire drive station composed of the drum 18, the drives 15,16 and the frame 17, is elevated and the end region of the conveyor 10 ascends gently to the transfer apparatus 19. The drive station is supported on a carriage 22, which may be a sled or skid. The carriage 22 also supports the transfer apparatus 19 so that the carriage 22 with its supported components form a single construction unit shiftable as the conveyor 10 is advanced. The carriage 22 has an extension 22' at the mineral face side.

As shown in FIG. 2, the extension 22' carries a guard or spill plate 23 for the conveyor 11. The guard plate 23 is preferably arcuate FIG. 1A and extends partly around the disc 19 over the peripheral region between the drum 18 and the discharge zone where the material leaves the disc 19 to pass onto the conveyor 11. A further guard plate 23' can also be fitted to the side wall of the conveyor 11 adjacent the scraper 21. The or each guard plate prevents lateral spillage of the material.

The extension 22' of the carriage 22 also supports a continuation of the plough guide 14, as shown in FIG. 1. As shown in FIG. 2, the disc 19 extends well beneath the drum 18 where the material is discharged and hence any residual material, such as coal fines, which is carried into the lower run of the conveyor 10, can still fall away onto the disc 11 for transference.

The transfer apparatus, as described, can be modified so that instead of employing a rotating disc 19 and a stationary scraper 21, the disc 19 may be stationary and the scraper 21 can be made to rotate about the axis 20. In this modified arrangement, the material discharged by the conveyor 10 falls onto the stationary disc 19 and is pushed onto the conveyor 11 by the scraper 21. It is possible to decrease the size of the stationary disc 19, since it is not necessary that this disc 19 extends over the entire width of the conveyor 11. Indeed, it is preferable for its discharge edge to be positioned between the sides of the conveyor 11. It is also possible to modify the shape of the stationary disc 19 and, by way of example, a semi-circular or segmental-shaped plate can be utilized instead. The stationary disc 19 or plate must extend beneath the discharge end of the conveyor 10 but the modified plate need only extend partly over the conveyor 11 and may, indeed, just align with the side wall thereof nearest the drives 15,16. Instead of using a single scraper or arm 21 rotating about the axis 20 over the stationary disc 19 or plate, it is possible to adopt an arrangement with a plurality of scrapers or arms 21 rotating together over the disc 19 or plate. The rotatably driven disc 19 or scraper(s) or arm(s) which serve to transfer material can be driven from the conveyor drive 16 via gearing connected with the bearing spindle rotating about the axis 20. The gearing is preferably variable-speed gearing.

Figure 3:
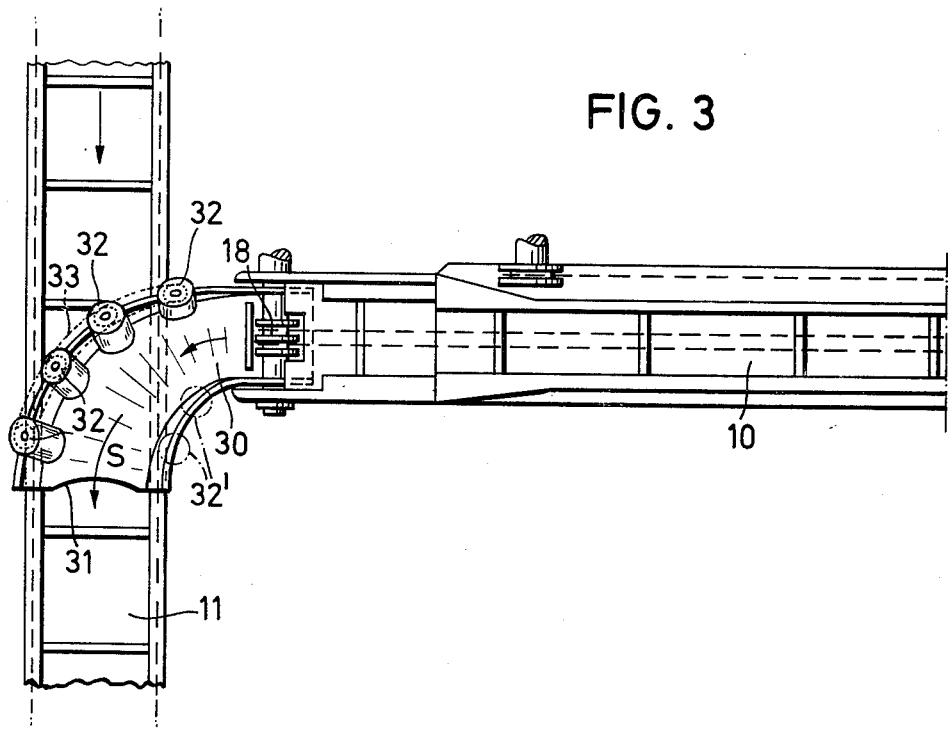
FIG. 3 is a schematic plan view of part of another installation employing a further embodiment of apparatus constructed in accordance with the invention.
Figure 4:
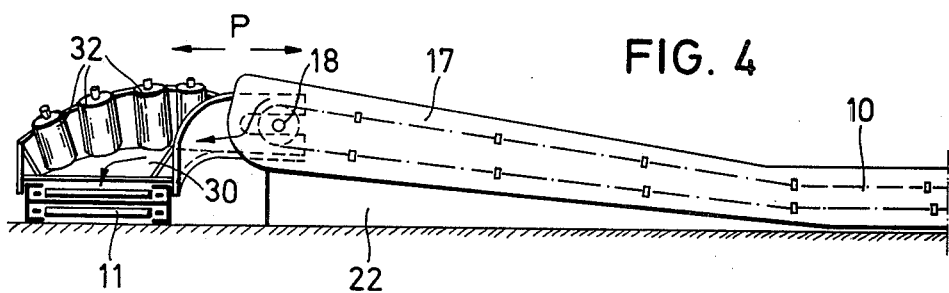
FIG. 4 is a part-sectional side view of the arrangement depicted in FIG. 3.

In the arrangement depicted in FIGS. 3 and 4, the longwall and roadway conveyors are again designated 10,11, respectively, and the drum of the conveyor 10 over which material is discharged is again designated 18. The transfer apparatus transferring material between the conveyors 10,11 here takes the form of an arcuate chute or channel 30 with a discharge end above the roadway conveyor 11. At the outer side of the chute 30, relative to the conveyor 10, there are mounted a plurality of rotatably driven entrainment devices in the form of rollers 32. As the rollers 32 rotate, they tend to impart force to the material which causes the material to move in the direction of arrow S in FIG. 3. The discharge end of the conveyor 10 can again be elevated and mounted on a carriage, as described previously. The chute 30, structurally combined with the carriage, preferably inclines downwardly towards the conveyor 11. Even if this inclination is only slight, the rollers 32 will prevent accumulation of material in the chute 30. The rollers 32 can be driven individually or collectively. One drive system utilizes a drive chain 33 or the like indicated diagrammatically in FIG. 3. Although the rollers 32 may have a smooth outer surface, it is preferable to shape these surfaces or to provide appropriate attachments, say paddles or vanes, to more effectively force the material along the chute 30. In a modified arrangement based on the principle of FIGS. 3 and 4, the rollers 32 can be replaced by an endless driven chain or similar traction means carrying vanes or scrapers disposed at the outer curve of the chute 30 at the position of the rollers 32.

It is also possible to place rollers 32 or their equivalent at the inside curve of the chute 30, as indicated by reference 32' in FIG. 3.

The chute 30 may be a simple integral construction but it is also possible to make the chute 30 as a multi-part component, e.g., telescopically extendible and retractible. The chute 30 is also best constructed to be laterally and/or vertically adjustable or pivotable in relation to the drive station frame 17.

The transfer apparatus described in connection with FIGS. 1 and 2, or modified as described, may be further modified so that in place of the guard plate 23, there are provided several stationary deflecting members for guiding the material during its transference. Instead of stationary deflecting members it is possible to utilize rollers similar to those designated 32 in FIGS. 3 and 4 or their equivalent, e.g., a scraper-chain assembly, positioned over the zone adopted by the guard plate 23. In the case where rollers replace the plate 23, these rollers can be mounted on a frame carried by the drive station or by the roadway conveyor 11. These rollers can be freely rotatable or driven.

Although the various transfer apparatuses described and illustrated have been exemplified in relation to scraper chain conveyors 10,11 in underground mine workings, it is possible to utilize such apparatuses in other environments and/or with other conveyors, e.g., belt conveyors., arranged to convey material in different directions.

We claim:

1. A mineral winning arrangement composed of a first mine face conveyor having a discharge zone, a second conveyor extending in a different direction to said first conveyor, apparatus for transferring material from the discharge zone of the first conveyor onto said second conveyor, said apparatus comprising a rotatably driven disc located beneath the discharge zone of said first conveyor and extending above said second conveyor, a drive station with drives mounted to a shiftable machine frame provided at the discharge zone of said first conveyor, a vertical bearing spindle supported by the machine frame and carrying the disc, the spindle and the disc being driven from one of said drives, a scraper extending over the upper surface of the disc to terminate at or near an inner side of the second conveyor nearest the first conveyor and a curved guard plate fitted to an outer side of the second conveyor to prevent lateral spillage of material.

2. Apparatus according to claim 1, wherein the scraper is positionally adjustable.

3. Apparatus according to claim 1, wherein the scraper extends from near said vertical spindle to the periphery of the disc.

4. Apparatus according to claim 1, wherein the scraper is pivotable about the vertical axis spindle.

5. Apparatus according to claim 1, wherein the radius of the disc is approximately the same as the width of the second conveyor.

6. Apparatus according to claim 1, wherein the disc is drivable at variable rotational speed.

7. Apparatus according to claim 1, wherein the disc has a replaceable component forming its upper transport surface.

8. Apparatus according to claim 1, wherein deflectors are arranged over part of the periphery of the disc.

* * * * *

UNITED STATES PATENT AND TRADEMARK OFFICE
CERTIFICATE OF CORRECTION

PATENT NO. : 4,300,673
DATED : November 17, 1981
INVENTOR(S) : Hans-Eckart Von Viebahn and Helmut Trusczcinski It is certified that error appears in the above—identified patent and that said Letters Patent is hereby corrected as shown below:

In the legend, paragraph [22], after "Filed:" delete "October 15, 1981" and insert in place thereof -- October 15, 1979 --.

Signed and Sealed this

Nineteenth Day of November 1985

[SEAL]

Attest:

DONALD J. QUIGG

Attesting Officer

Commissioner of Patents and Trademarks